US011221456B2

(12) United States Patent
    Ott

(10) Patent No.: US 11,221,456 B2
(45) Date of Patent: Jan. 11, 2022

(54) PROTECTIVE TUBE FOR MICRO-DUCT INSTALLATION OF FIBER OPTIC CABLE

(71) Applicant: COMMSCOPE TECHNOLOGIES LLC, Hickory, NC (US)

(72) Inventor: Michael James Ott, Hudson, WI (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/955,540

(22) PCT Filed: Dec. 19, 2018

(86) PCT No.: PCT/US2018/066466
    § 371 (c)(1),
    (2) Date: Jun. 18, 2020

(87) PCT Pub. No.: WO2019/126303
    PCT Pub. Date: Jun. 27, 2019

(65) Prior Publication Data
    US 2021/0003801 A1    Jan. 7, 2021

Related U.S. Application Data

(60) Provisional application No. 62/607,639, filed on Dec. 19, 2017.

(51) Int. Cl.
    G02B 6/44    (2006.01)
    G02B 6/38    (2006.01)
(52) U.S. Cl.
    CPC ......... G02B 6/4463 (2013.01); G02B 6/3849 (2013.01); G02B 6/3887 (2013.01); G02B 6/4432 (2013.01); G02B 6/4438 (2013.01)

(58) Field of Classification Search
    CPC ......... G02B 6/4463; G02B 6/54; G02B 6/502
    See application file for complete search history.

(56) References Cited

U.S. PATENT DOCUMENTS

| 2010/0254659 | A1 | 10/2010 | Anderson et al. |
| 2015/0241639 | A1 | 8/2015 | Lu et al. |
| 2016/0202431 | A1 | 7/2016 | Hill et al. |
| 2017/0168245 | A1 | 6/2017 | Nhep |

FOREIGN PATENT DOCUMENTS

| WO | 2017/095928 A1 | 6/2017 |
| WO | 2018/144529 A1 | 8/2018 |

OTHER PUBLICATIONS

International Search Report and Written Opinion of the International Searching Authority for corresponding International Patent Application No. PCT/US2018/066466 dated Apr. 16, 2019, 14 pages.

*Primary Examiner* — Omar R Rojas
(74) *Attorney, Agent, or Firm* — Merchant & Gould P.C.

(57) ABSTRACT

A factory processed fiber optic ferrule assembly and field installable cable system are configured to pass through tight, microducts when routed to a demarcation point. A connector housing attaches to the fiber optic ferrule assembly at the demarcation point (or after leaving the tight, microducts) to form a connectorized end of the optical fiber. A fiber tip is protected before leaving the factory until connection is desired.

16 Claims, 13 Drawing Sheets

PROTECTIVE TUBE FOR MICRO-DUCT INSTALLATION OF FIBER OPTIC CABLE

CROSS-REFERENCE TO RELATED APPLICATION

This application is being filed on Dec. 19, 2018 as a PCT International a National Stage Application of PCT/US2018/066466, filed on Dec. 19, 2018, which claims the benefit of U.S. Patent Application Ser. No. 62/607,639, filed on Dec. 19, 2017, the disclosures of which are incorporated herein by reference in their entireties. To the extent appropriate, a claim of priority is made to each of the above disclosed applications.

TECHNICAL FIELD

The present disclosure relates to field installable cable systems, and more particularly to an apparatus for the installation of pushable fiber optic cables in micro-ducts.

BACKGROUND

As fiber deployments continue, more and more interest is being generated in placing the optical network terminals (ONT) inside the living areas of dwellings (e.g., in proximity to televisions and computers). This is especially true today in multifamily dwelling units (MDU) applications.

Because of the location and other constraints, pre-terminated assemblies are often threaded and routed through small holes in walls of the dwellings, through small openings in cabinetry, and through microducts (e.g., underground ducts, ducts in buildings, etc.). These applications demands that the pre-terminated parts pass through a narrow, tortuous path before being mated to traditional connectors in the ONT equipment.

The problem with microducts is that most often it is difficult to route certain fiber optic arrangements through. Fully assembled fiber optic connectors or even partially pre-assembled fiber optic connectors can be relatively large to be readily pushed, blown, or pulled through microducts.

There is a desire to improve the delivery of optical fiber cables by using arrangements that have sufficiently small form factors to fit through narrow, routing paths or microducts at increased distances.

SUMMARY

Certain aspects of the present disclosure relate to a field installable cable system for routing fiber optic cables with a ferrulized end through microducts.

Aspects of the present disclosure relate to a protective tube that is both small, flexible, and has low-friction characteristics to allow for easy deployment of a pushable fiber optic cable through a microduct.

Another aspect of the present disclosure relates to a system in which after the protective tube is removed, a connector body can be mounted over a ferrule assembly including a terminated optical fiber of a fiber optic cable.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure generally relates to a field installable cable system that can be used in a microduct system for FTTx installation. A typical passive FTTP network includes fiber optic cables routed from a central location (e.g., a service provider's central office) to an outer edge of the network where subscribers are located. FTTx networks can utilize an architecture having centralized optical splitting (e.g., power splitting at hubs such as fiber distribution hubs). This type of architecture can be referred to as a "star" architecture where a hub is the center of the star and distribution cables radiate out from the hub. Distributed split architectures can also be used where optical splitting is more distributed through the network. Regardless of the architecture, there is a need to effectively use microducts to extend the network at reduced cost.

Micro-ducts are often a preferred option for extending fiber optic networks. One advantage of micro-ducts relates to the ease of installation allowed by their relatively small cross-sectional size. For example, micro-ducts can effectively be installed in narrow trenches which are particularly useful for routing fiber optic drop lines from the curb or other location near the edge of a fiber optic network to a subscriber location. In certain examples, micro-ducts can have outer diameters equal to or less than 8.5 mm and inner diameters equal to or less than 6 mm.

Aspects of the present disclosure relate to fiber optic cabling assemblies adapted to effectively be routed through micro-ducts. In one example, fiber optic cable assemblies in accordance with the principles of the present disclosure can be configured to be capable of being pushed through a relatively long micro-duct (e.g., a micro-duct in excess of 1000 feet). In this way, it is not required use blowing equipment and a pulling line is not required to be pre-routed through the micro-duct. Fiber optic cable assemblies in accordance with the principles of the present disclosure are preferably relatively small in cross-sectional size and are also configured to be at least partially pre-connectorized. For example, a ferrule can be pre-mounted (e.g., factory installed) at the end of an optical fiber of the fiber optic cable assembly prior to the fiber optic cable assembly being routed through a micro-duct. This is advantageous because such a configuration eliminates the need for fiber optic connectors to be field spliced to the fiber optic cable after routing through the micro-ducts. Eliminating the field installation of fiber optic connectors can greatly reduce installation times and can reduce the level of skill required by the installer.

Figure 1:
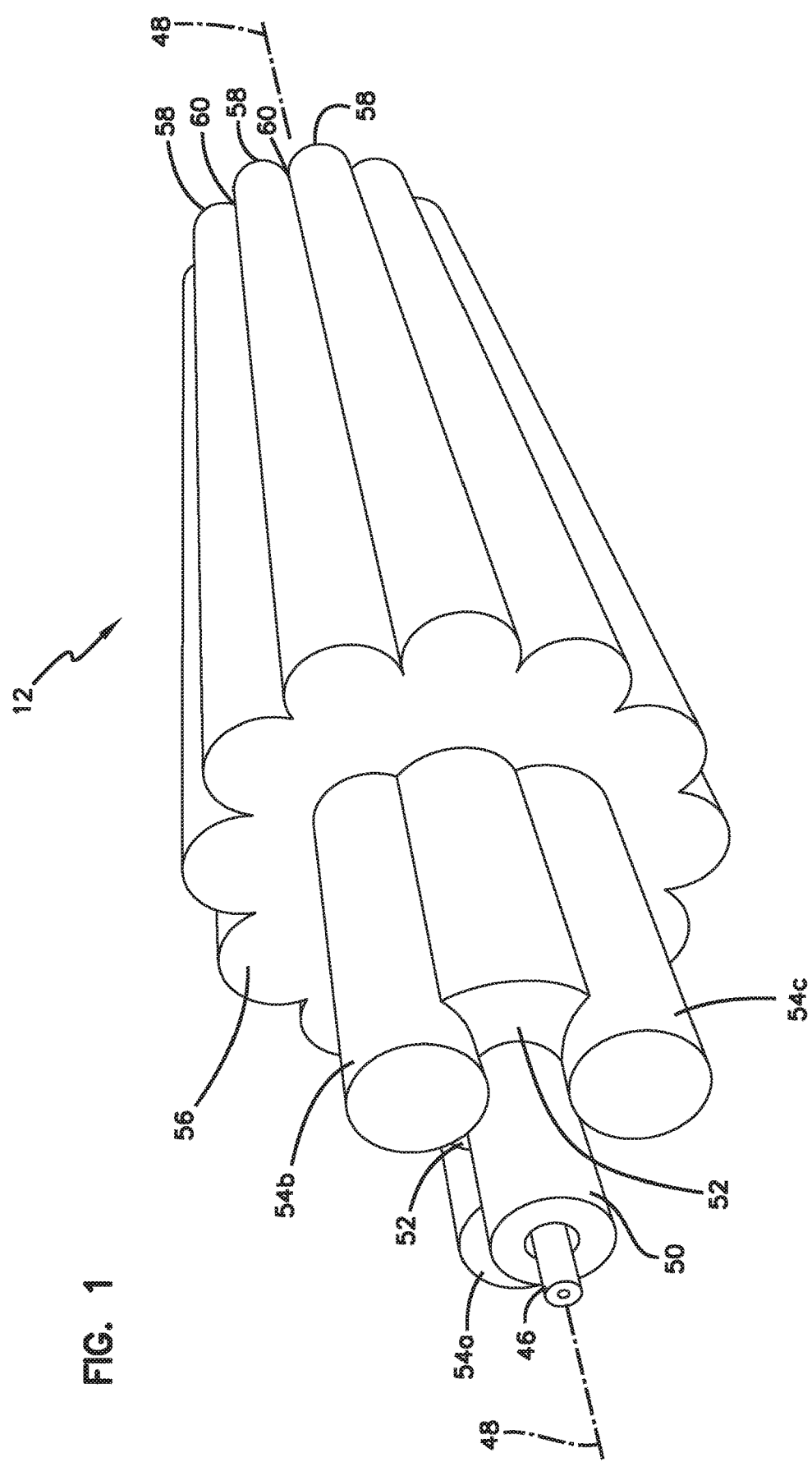
FIG. 1 is a perspective view of an end of a length of cable, in accordance with the principles of the present disclosure.

FIG. 1 is a perspective view of an end of a length of an example pushable fiber optic cable 12 for deployment through a conduct in accordance with principles of the present disclosure. Although a short length of the fiber optic cable 12 is depicted, the fiber optic cable 12 can be configured in extended lengths (e.g., 1,000 feet). The pushable fiber optic cable 12 includes an inner core with a single optical fiber 46 for transmitting data signals. The optical fiber 46 may be a 250 micron diameter optical fiber, although alternatives are possible. The optical fiber 46 can be centrally located along a center axis 48 of the fiber optic cable 12. The fiber optic cable 12 includes an optional buffer tube 50 that surrounds the optical fiber 46. The buffer tube 50 is centered along the center axis 48 of the fiber optic cable 12. Although a single optical fiber 46 is depicted, it will be appreciated that more than one optical fiber 46 may be located within the buffer tube 50, such as two, four, eight, or even up to 24 optical fibers. The optical fiber 46 may be positioned loosely within the buffer tube 5 to provide a "loose-tube arrangement" or may be positioned to provide a "tight-tube" arrangement.

The inner core of the fiber optic cable 12 may include a plurality of strength members 52. In one example, the plurality of strength members 52 are fibers or yarns that completely surround the buffer tube 50. The yarns may be constructed of aramid yarns, such as those sold under the trademark of Kevlar. The fiber optic cable 12 includes at least on rigid strength member 54 within the inner core. In the example depicted, three glass reinforced plastic (GRP) rods 54a, 54b, 54c are spaced evenly around the buffer tube 50 (e.g., at equal intervals of one hundred twenty degrees apart), although alternatives are possible. In certain examples, two rigid strength members 54 may be used and spaced one hundred and eighty degrees apart such that they are positioned on opposite sides of the buffer tube 50. The rigid strength members 54 are disposed within the strength members 52. The rigid strength members 54 impart rigidity to the overall fiber optic cable 12, which allows the fiber optic cable 12 to be pushed into the conduit and follow a straight line. Although GRP rods have been described, other types of rigid rods may be used.

The fiber optic cable 12 includes a jacket 56 that surrounds the inner core. The jacket 56 surrounds the optical fiber 46, the buffer tube 50, the strength members 52, and the rigid strength members 54a-c. The jacket 56 has an undulating thickness entirely around the inner core to form a plurality of alternating projections 58 and valleys 60 on an outer surface of the jacket 56. The projections 58 and valleys 60 extend along the length of the fiber optic cable 12. The projections 58 will not deform or fold over when encountered by interior portions of a conduit. The fluted outer shape helps to reduce friction between the jacket 56 of the fiber optic cable 12 and an interior wall of a conduit. As such, the length of deployed fiber optic cable 12 increases without a need for lubricants or air. The fiber optic cable 12 can be suitable for a broad range of uses (i.e., pushing installation, blowing installation, as well as indoor and outdoor applications).

The jacket material (i.e., the outer sheath) is typically made from a single thermoplastic material. In certain examples, the jacket 56 may be formed of a low smoke zero halogen (LSZH) material, although alternatives are possible. The overall diameter of the fiber optic cable 12 is about 5.0 millimeters (mm). In certain examples, the overall diameter of the fiber optic cable 12 is about 3.5 mm. Example low friction pushable cables can be found in U.S. Provisional Patent Application No. 62/453,391, filed Feb. 1, 2017, and titled "Low Friction Fluted LSZH Indoor/Outdoor Optic Fiber Cable," the disclosure of which is incorporated herein by reference.

Figure 2:
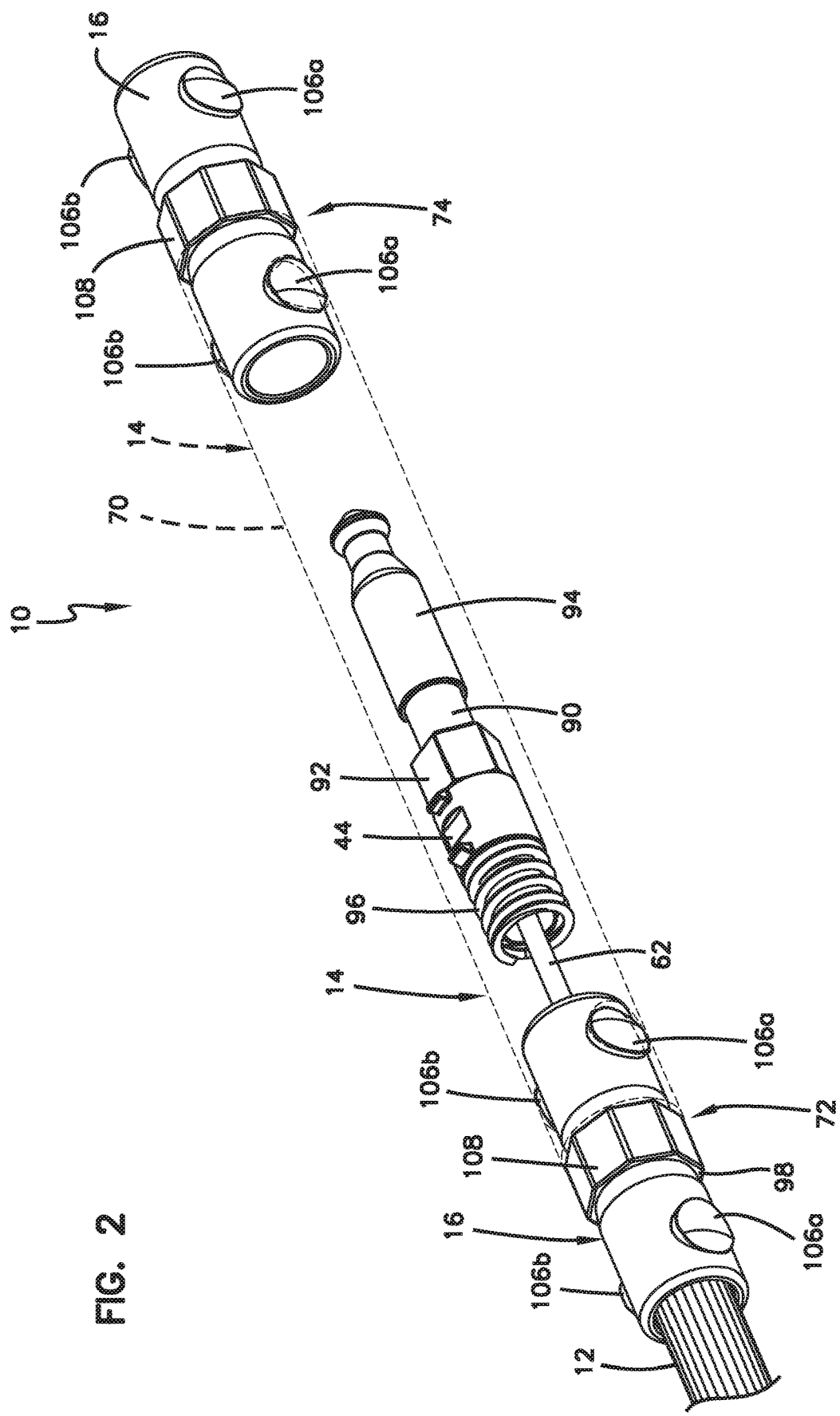
FIG. 2 is a perspective schematic view of a field installable cable system including the cable of FIG. 1, coupling members, a fiber optic ferrule assembly, and a protective tube in accordance with the principles of the present disclosure.

Turning to FIG. 2, an example field installable cable system 10 is depicted. The example field installable cable system 10 can include the example pushable fiber optic cable 12, a fiber optic ferrule assembly 64 (see FIG. 4), a protective tube 14 adapted to cover the fiber optic ferrule assembly 64, and a coupling member 16 (e.g., connector) for attaching the protective tube 14 to the fiber optic cable 12.

Figure 3:
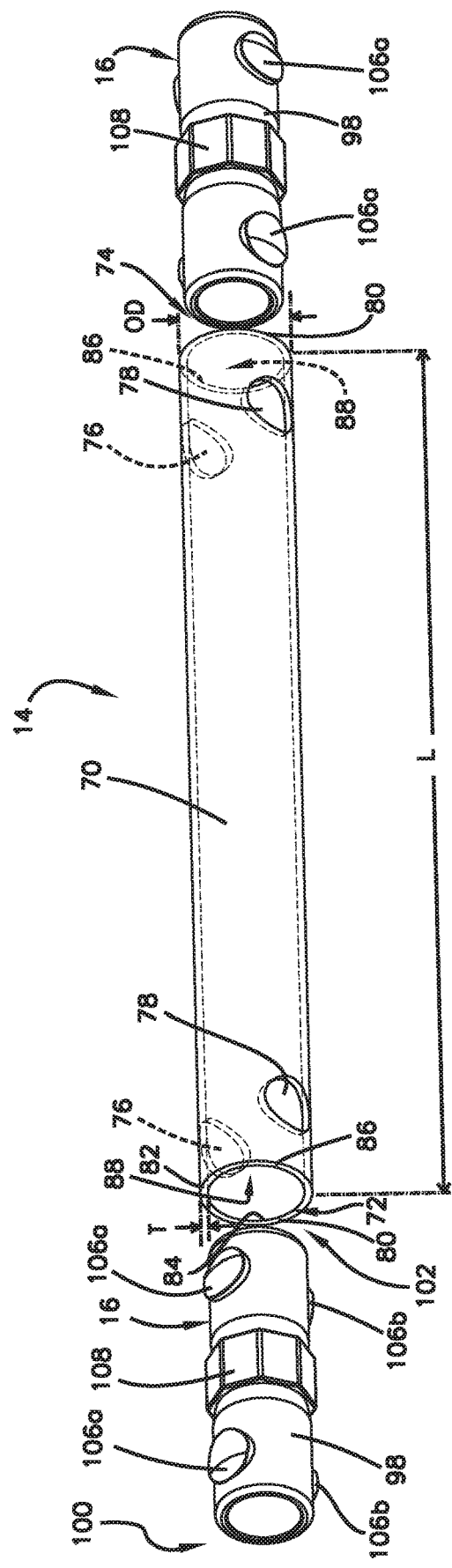
FIG. 3 is a perspective schematic view of the coupling members and the protective tube of FIG. 2.

Turning to FIG. 3, a schematic view of the protective tube 14 is shown. The protective tube 14 includes a circumferential wall 70 that has a first open end 72, a second open end 74, and an outside diameter OD (e.g., outer diameter). In certain examples, the outside diameter OD of the circumferential wall 70 of the protective tube 14 can be slightly smaller than that of a micro-duct through which the protective tube 14 is routed. In certain examples, the outside diameter OD of the circumferential wall 70 of the protective tube 14 is no more than 5.5 mm. In certain examples, the outside diameter OD of the circumferential wall 70 of the protective tube 14 is less than 6.0 mm.

The circumferential wall 70 of the protective tube 14 can have a wall thickness T of about 0.4 mm, although alternatives are possible. In certain examples, the wall thickness T of the circumferential wall 70 of the protective tube 14 can be less than about 0.4 mm. In certain examples, the wall thickness T of the circumferential wall 70 of the protective tube 14 can have a constant thickness between the first and second open ends 72, 74 and around a circumference thereof.

The protective tube 14 can have a longitudinal length L that extends from the first open end 72 to the second open end 74. In certain examples, the longitudinal length L of the protective tube 14 can range from about 400 mm to about 600 mm, although alternatives are possible.

The first and second open ends 72, 74 of the protective tube 14 each define a first hole 76 and a second hole 78. The first and second holes 76, 78 have a largest outer diameter of no more than 2 mm. In certain examples, the first and second holes 76, 78 have a largest outer diameter of no more than 3 mm. In certain examples, the first and second holes 76, 78 have a largest outer diameter of no more than 4 mm. The first hole 76 extends through a first sidewall 80 of the protective tube 14, from an outside surface 82 to an inside surface 84 thereof. The second hole 78 extends through a second sidewall 86 of the protective tube, from the outside surface 82 to the inside surface 84 thereof. The first and second holes 76, 78 can each be aligned relative to one another on opposite sides of the protective tube 14, although alternative configurations are possible. The protective tube 14 further defining a bore 88. In certain examples, the first and second open ends 72, 74 of the protective tube 14 may define one single hole. In other examples, the first and second open ends 72, 74 of the protective tube 14 may define more than two holes.

The protective tube 14 may be constructed as a thin-walled, strong, round tube, made of a polymeric material. In certain examples, the polymeric material includes polytetrafluoroethylene (e.g., trademark name Teflon®). The protective tube 14, as designed according to the present disclosure, achieves certain advantages, such as providing ultra low friction due to its slippery properties, which is especially suited for installation in small microducts, holes, or other paths. The protective tube 14 is also flexible enough to be easily deployed or pushed through microducts. Furthermore, the protective tube 14 has a small outer diameter that is especially suited for installation in small microducts. Furthermore, the protective tube 14 provides excellent protection against water, dirt, dust, etc. microbending, and mechanical damage.

Figure 4:
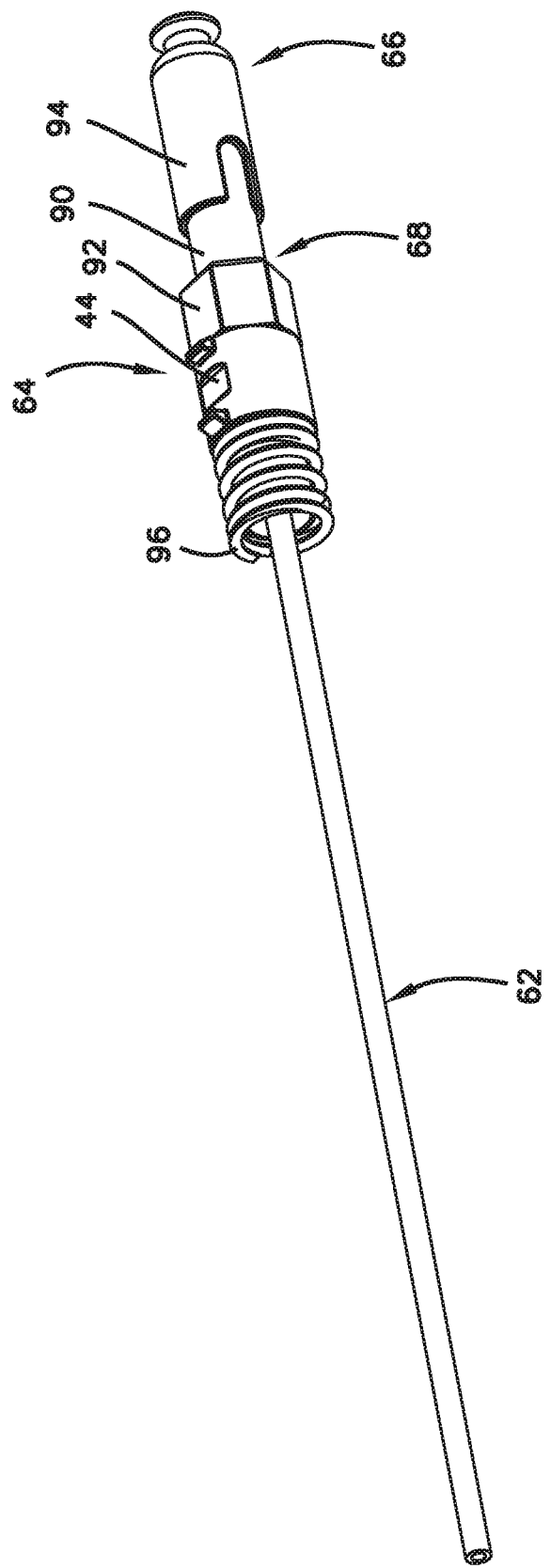
FIG. 4 is a perspective schematic view of the fiber optic ferrule assembly of FIG. 2.
Figure 5:
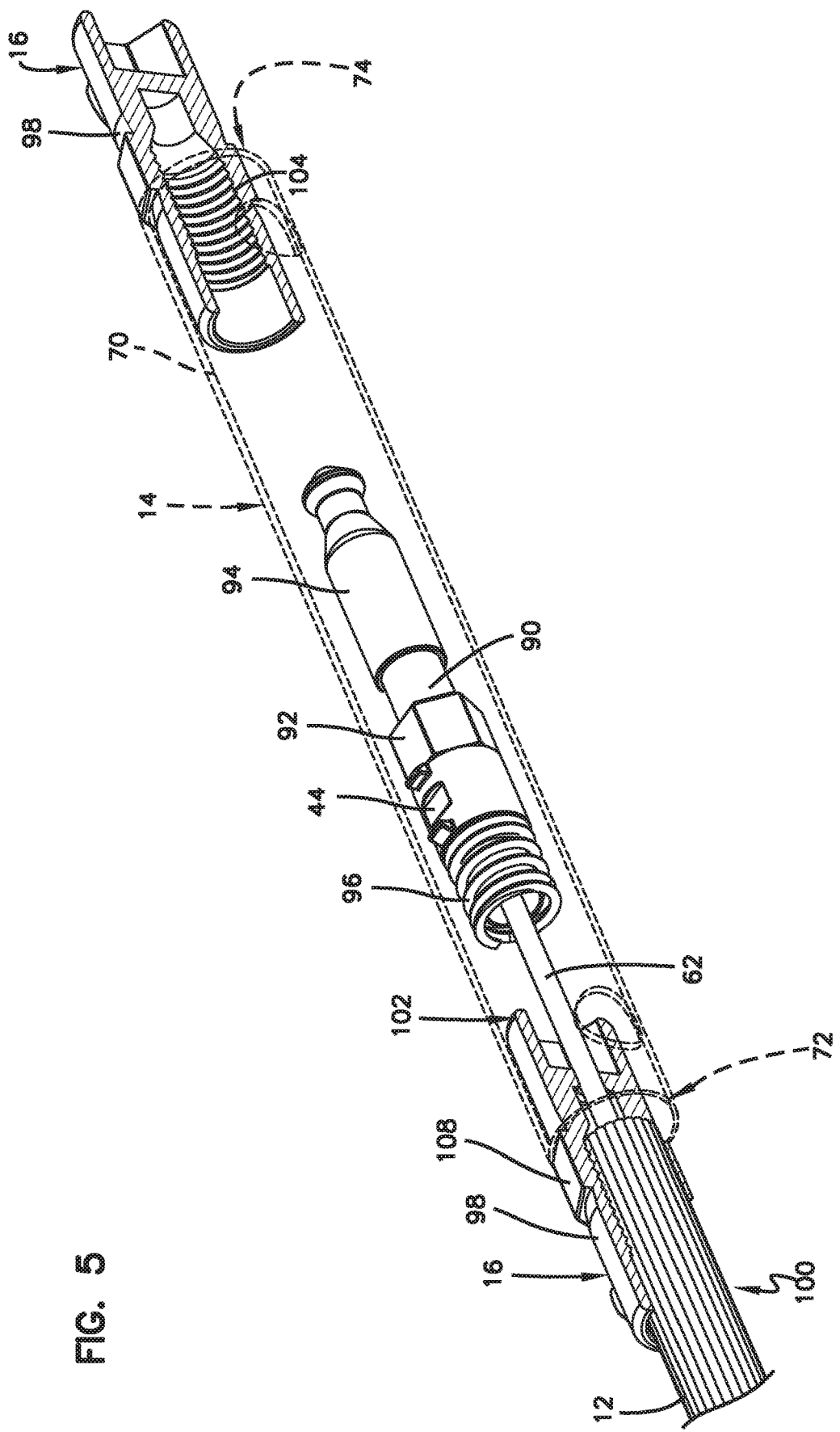
FIG. 5 is a perspective schematic view of the field installable cable system of FIG. 2 depicting a cross-sectional view of the coupling members.

Referring now to FIGS. 4-5, the fiber optic ferrule assembly 64 is illustrated. The fiber optic ferrule assembly 64 includes a fiber optic ferrule 90 and a ferrule hub 92. A keying member 44 mounts over the ferrule hub 92. Generally, the fiber optic ferrule 90 and the ferrule hub 92 are secured together by convenient methods including press fit or adhesive mounts. The fiber optic ferrule assembly 64 may also include a spring 96 that also mounts over the ferrule hub 92 and positioned there behind.

The pushable fiber optic cable 12 includes an optical fiber 62 that is terminated within the fiber optic ferrule assembly 64 in a fiber processing procedure. The fiber optic ferrule 90 can have a front end 66 and a rear end 68 opposite the front end 66. A portion of the optical fiber 62 can extend rearwardly from the rear end 68 of the fiber optic ferrule 90. The ferrule hub 92 surrounds the rear end 68 of the fiber optic ferrule 90.

A tip of the optical fiber 62 and an end face of the ferrule are preferably polished. The optical fiber 62 and/or the fiber optic ferrule 90 are tuned and cleaned. A dust cap 94 is disposed over the front end 66 of the fiber optic ferrule 90 to cover the fiber tip. In an example, the dust cap 94 is friction fit to the fiber optic ferrule 90 in an axially fixed position until a predetermine amount of axial force is applied to the dust cap 94. In certain examples, the fiber processing procedure, from insertion of the fiber into the ferrule to mounting the dust cap, occurs in a factory. The dust cap 94 maintains the cleanliness of the fiber tip during shipping and installation.

The protective tube 14 can be mounted around the fiber optic ferrule assembly 64 to cover the fiber optic ferrule assembly 64 which can then be pushed through a hole, microduct, or other path. That is, the fiber optic ferrule 90, ferrule hub 92, spring 96, and dust cap 94 can be positioned within the bore 88 of the protective tube 14 for deployment through a hole, microduct, or other path. In certain examples, the overall weight of the fiber optic ferrule assembly 64 and protective tube 14 is no more than 0.2 ounces (oz), although alternatives are possible. In certain examples, the weight of the field installable cable system 10 is about 0.1 oz.

The protective tube 14 is configured to hold the components of the fiber optic ferrule assembly 64 in axially fixed positons relative to each other and relative to the protective tube 14 during installation. In certain examples, the protective tube 14 also is configured to hold the fiber optic ferrule assembly 64 in a rotationally fixed position relative to the protective tube 14 during installation. The small size of the protective tube 14 including the fiber optic ferrule assembly 64 allows the protective tube 14 and fiber optic ferrule assembly 64 to be readily routed through a microduct, hole, or other path in the field. The protective tube 14 can be pushed through a microduct, hole, or other path that has an inside diameter (e.g., inner diameter) of no more than 6 mm, although alternatives are possible. Thus, a maximum cross-dimension of a connector is less than or equal to the outer diameter OD of the protective tube 14.

Figure 6:
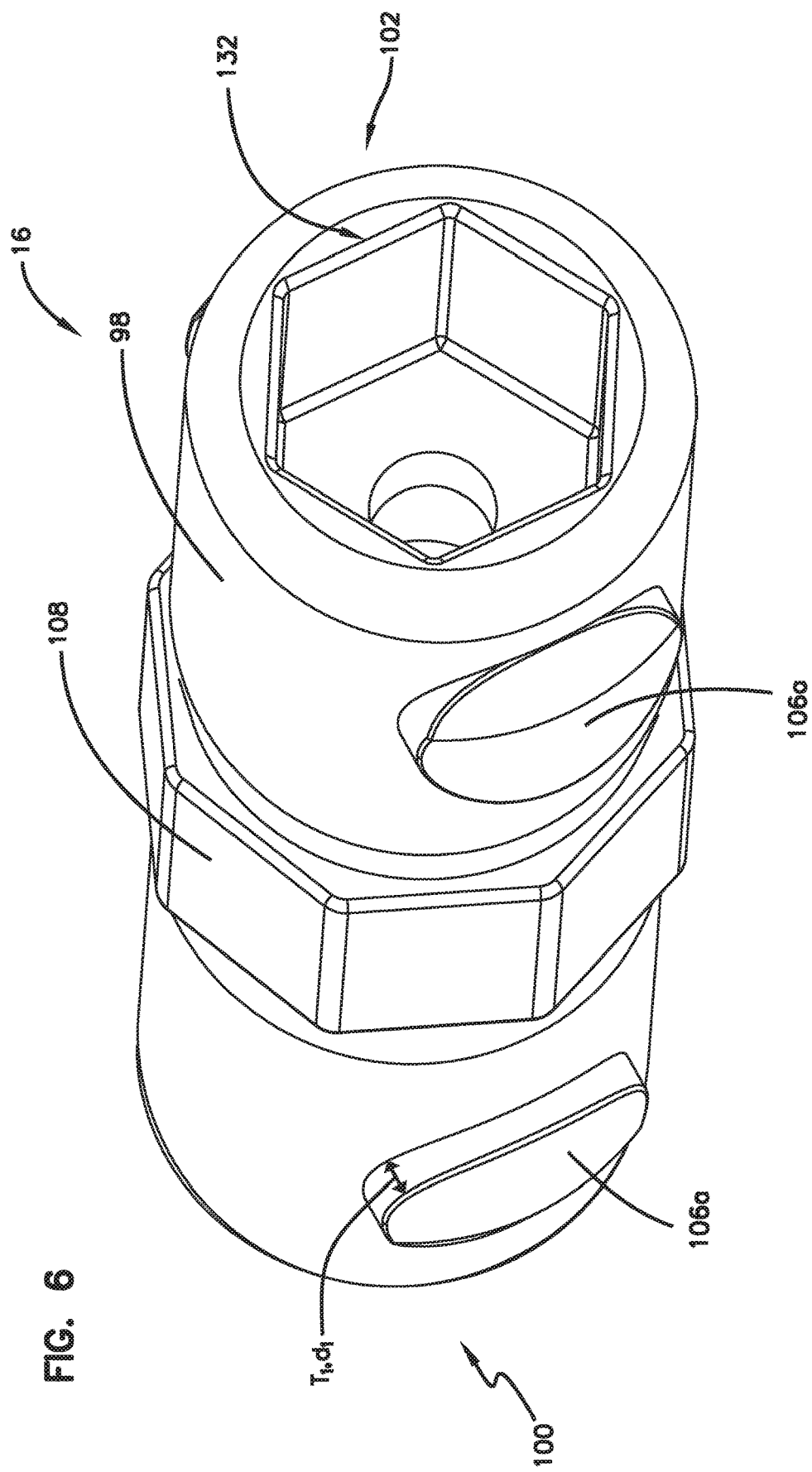
FIG. 6 is a perspective end view of one of the coupling members of FIG. 2.
Figure 7:
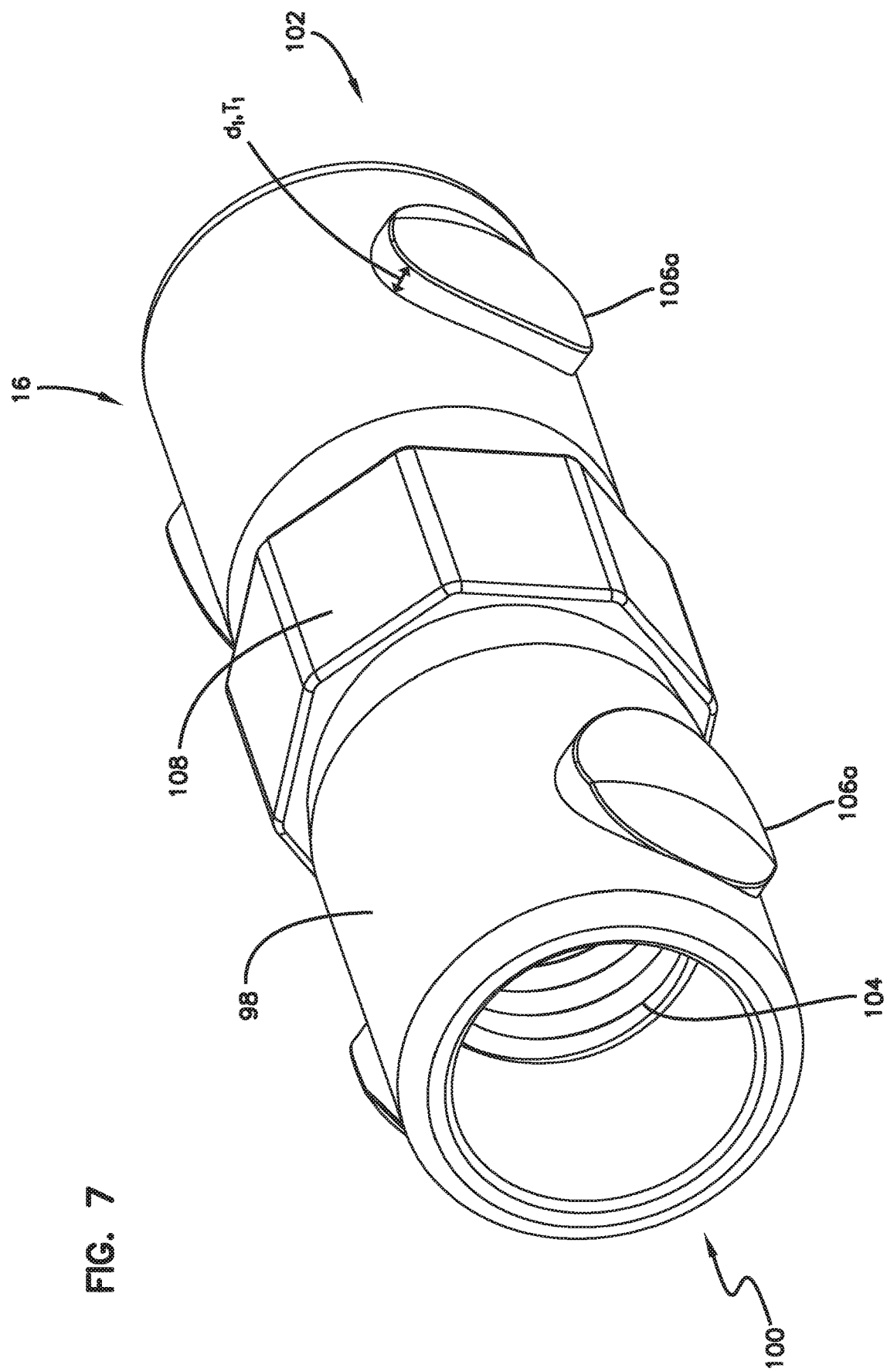
FIG. 7 is a perspective view of an opposite end of the coupling members of FIG. 6.

Referring to FIG. 5, a schematic cross-sectional view of the coupling member 16 which can be removably connected to the fiber optic cable 12 and the protective tube 14. FIGS. 6-7 depict schematic views of the coupling member 16.

The coupling member 16 has a main body 98 with a distal end 100 and a proximal end 102. The distal end 100 of the coupling member 16 is adapted to mount over the jacket 56 of the fiber optic cable 12. The distal end 100 of the coupling member 16 can include internal threaded surfaces 104. When the coupling member 16 is threaded onto the fiber optic cable 12, the internal threaded surfaces 104 engage the jacket 56 of the fiber optic cable 12 to secure the coupling member 16 thereon.

The proximal end 102 of the coupling member 16 can be mounted within the bore 88 of the protective tube 14 at the first open end 72. The proximal end 102 of the coupling member 16 can include first and second tabs 106a, 106b that are positioned on opposite sides of the main body 98 of the coupling member 16. In certain examples, the first and second tabs 106a, 106b can be integrally formed with the main body 98 of the coupling member 16, although alternatives are possible. The coupling member 16 also has a nut 108 to assist in tightening the threaded coupling member 16 onto the fiber optic cable 12. The nut 108 can have an external flat-sided shape (e.g., octagon shape) with an outer diameter of no more than 5 mm, although alternatives are possible. The coupling member 16 can also include an internal hex 132 for utilizing tools that can assist twist-on effort.

When the proximal end 102 of the coupling member 16 is mounted and rotated within the bore 88 of the protective tube 14 at the first open end 72, the first and second tabs 106a, 106b can extend a distance through the first and second holes 76, 78, respectively, for connecting the coupling member 16 to the protective tube 14. Although the connection is depicted as a "twist-on" and "twist-off" type of attachment, it will be appreciated that other fixation operations may be used. In certain examples, the coupling member 16 may have chamfered surfaces to assist with insertion into the protective tube 14.

In certain examples, the distal end 100 of the coupling member 16 may also include the first and second tabs 106a, 106b such that the coupling member 16 can provide a connection at both the distal and proximal ends 100, 102. It will be appreciated that the coupling member 16 can be used at both ends of the protective tube 14. In certain examples, the coupling member 16 can also be mounted in the second open end 74 of the protective tube 14 to be used as a standalone end cap or a seal (e.g., packaging tip) which may also assist with installation distances. The first and second tabs 106a, 106b can extend a distance through the first and second holes 76, 78, respectively, for connecting the coupling member 16 to the protective tube 14 at the second open end 74. Thus, the coupling member 16 can be used as a cable attachment and/or a seal.

The first and second tabs 106a, 106b can have a thickness $T_1$ equal to or less than the constant thickness T of the circumferential wall 70 of the protective tube 14. When the coupling member 16 is connected to the protective tube 14 and the first and second tabs 106a, 106b are received and fully engaged within the first and second holes 76, 78, respectively, the first and second tabs 106a, 106b do not extend outside or beyond the outer diameter OD of the protective tube 14. That is, there is no extra thickness beyond the outer diameter OD of the protective tube 14 when the coupling member 16 is connected to the protective tube 14. In certain examples, the distance di the first and second tabs 106a, 106b extend into the first and second holes 76, 78, respectively, is less than the constant thickness T of the circumferential wall 70 of the protective tube 14. In certain examples, the first and second tabs 106a, 106b extend radially into the first and second holes 76, 78, respectively, at a distance di that is approximately one-half of the constant thickness T of the circumferential wall 70 of the protective tube 14.

The configuration of the field installable cable system 10 remains small enough such that it can easily fit in a microduct, hole, or other path. The field installable cable system 10 is configured to allow the fiber optic cable 12 to be pushed at increased distances with reduced buckling and bending through a microduct, hole, or other path.

Figure 8:
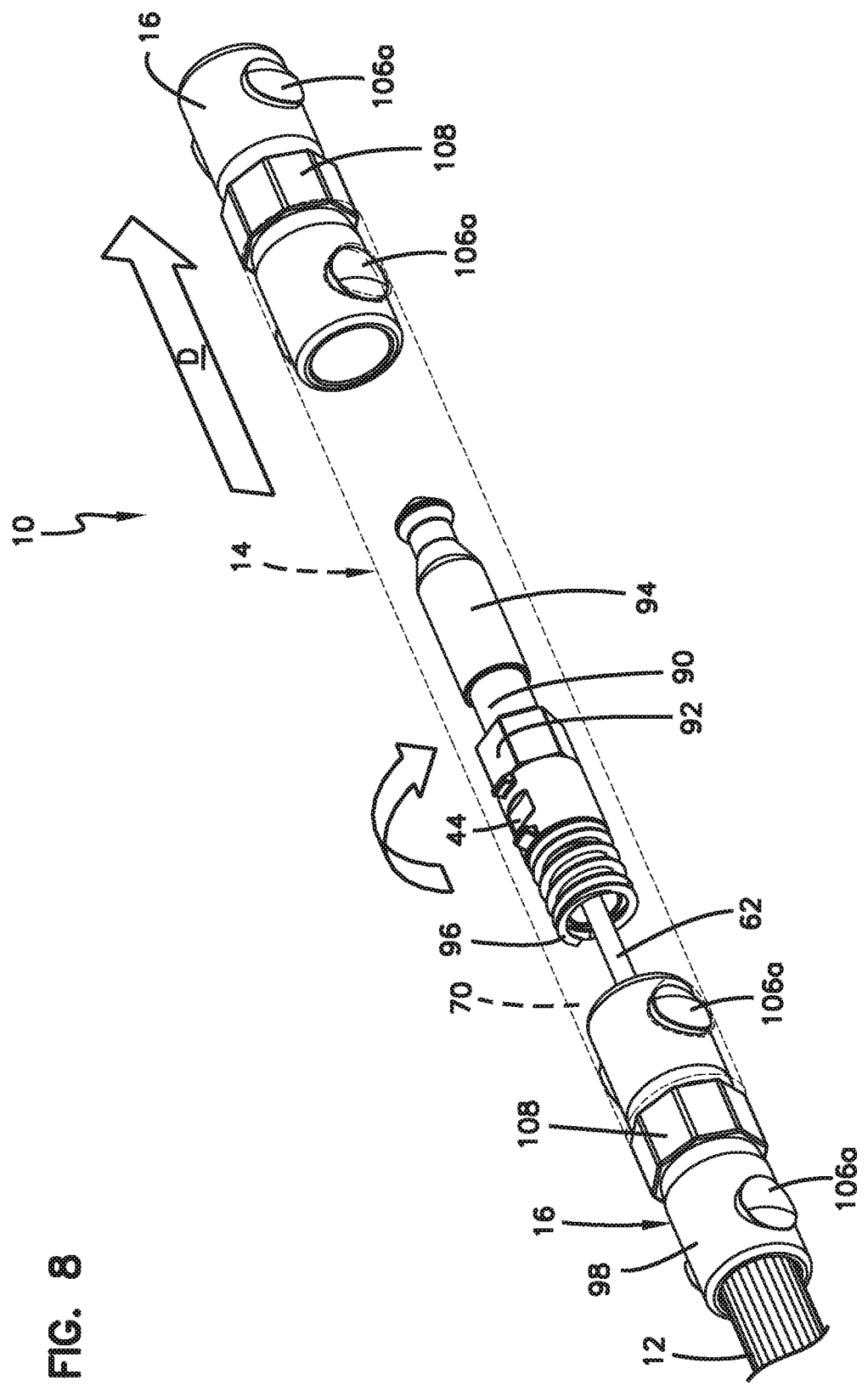
FIG. 8 is a perspective schematic view of the field installable cable system including the cable of FIG. 2 depicting the removal of the protective tube in accordance with the principles of the present disclosure.
Figure 9:
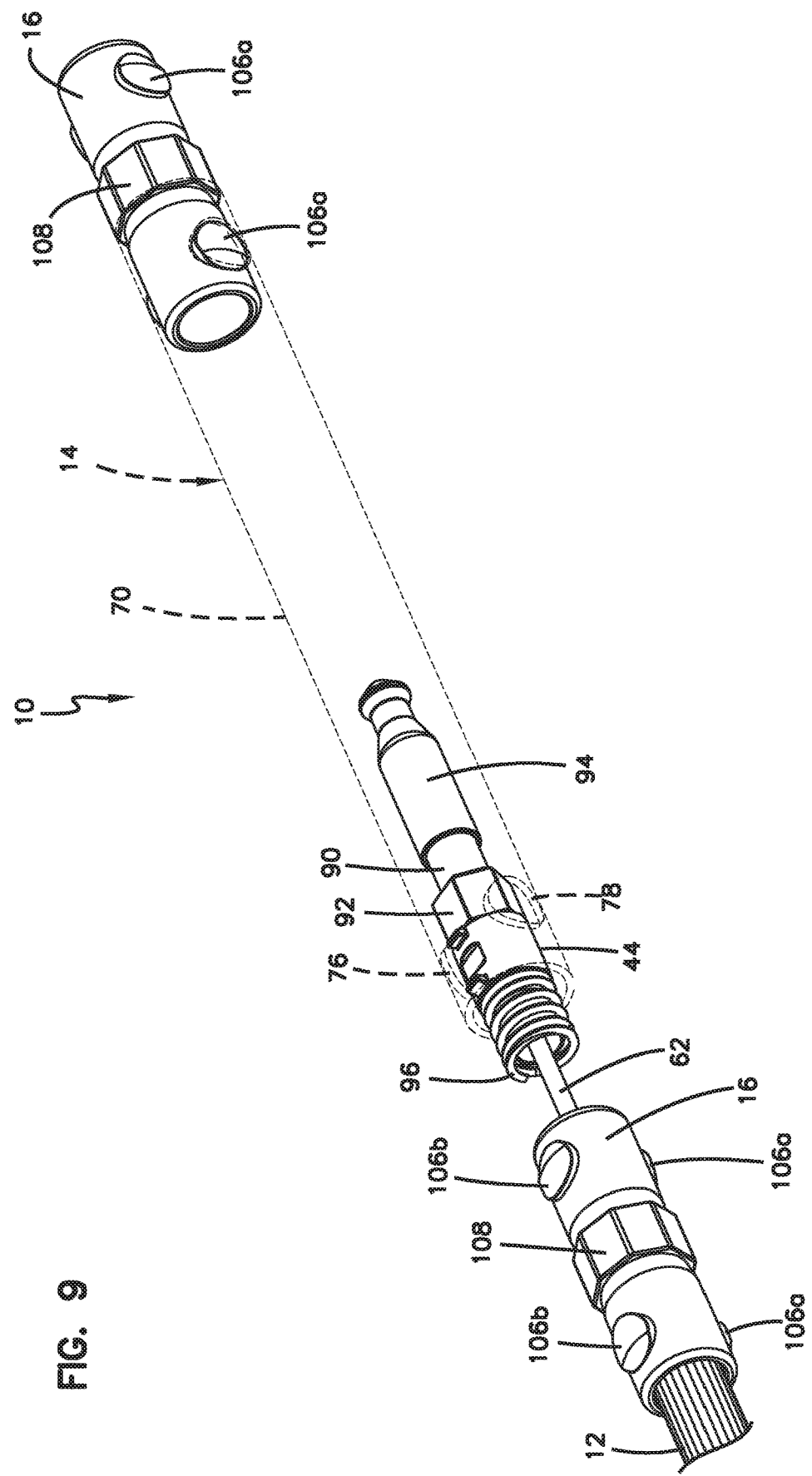
FIG. 9 is a perspective schematic view of the field installable cable system of FIG. 8 showing the protective tube detached from one of the coupling members.

Referring to FIGS. 8-9, once the field installable cable system 10 has been installed or routed through a microduct, hole, or other path, the coupling member 16 can be detached of otherwise removed from the protective tube 14 by rotating the coupling member 16 approximately 90 degrees such that the first and second tabs 106a, 106b can disengage from the first and second holes 76, 78, respectively. Next after rotating the coupling member 16 about 90 degrees, the protective tube 14 can be pulled generally in a direction D and disconnected from the coupling member 16 such that the remaining connector parts can be assembled on the fiber optic ferrule assembly 64.

Figure 10:
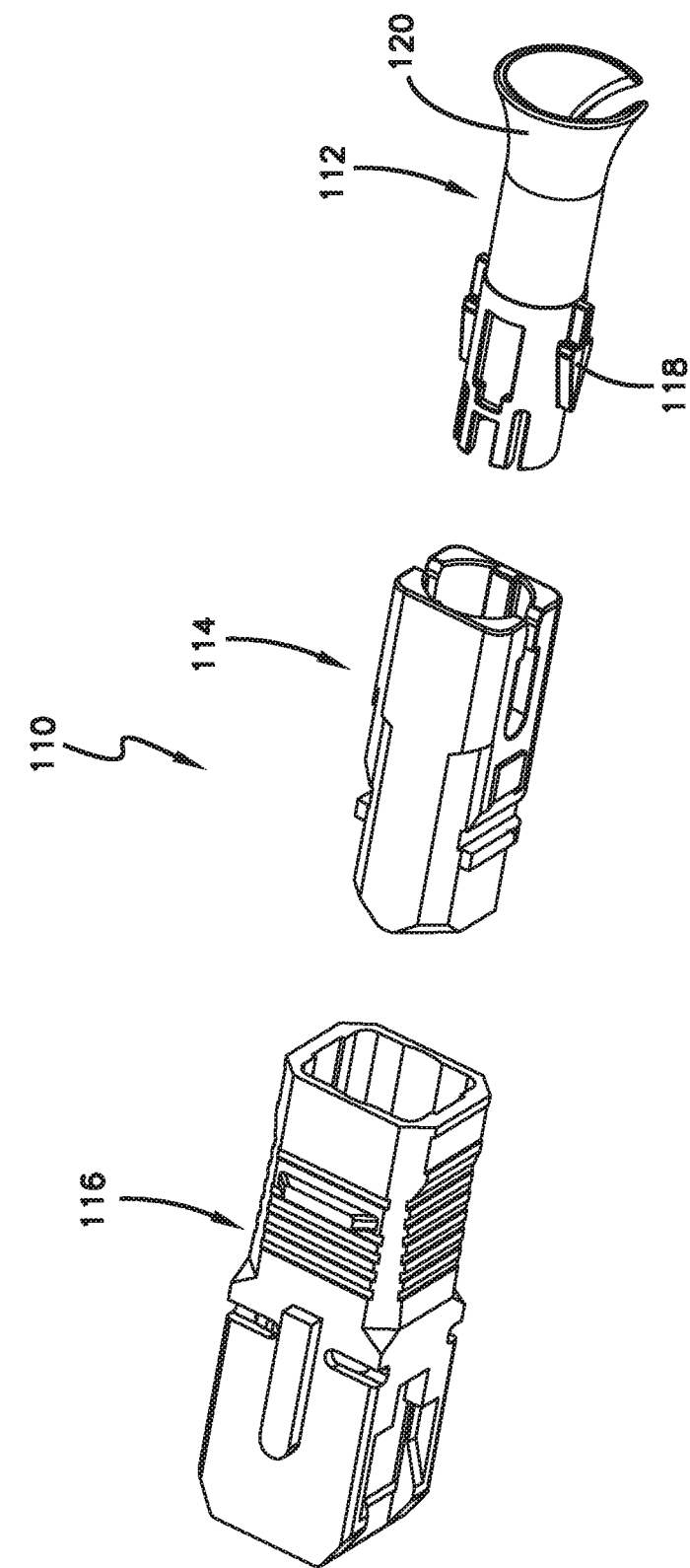
FIG. 10 is a front perspective view of example components of a fiber optic connector configured to be installed about the fiber optic ferrule assembly of FIG. 4.

FIG. 10 depicts a field installable subassembly 110 that has fiber optic connector components (e.g., housings, shells, seals, keys, plugs, etc.) that can be quickly and easily mounted over the fiber optic ferrule assembly 64 in the field. Example fiber optic connector and assembly can be found in PCT International Patent Application No. PCT/US2016/064223, filed Nov. 30, 2016, and titled "Fiber Optic Connector and Assembly Thereof," the disclosure of which is incorporated herein by reference.

Figure 11:
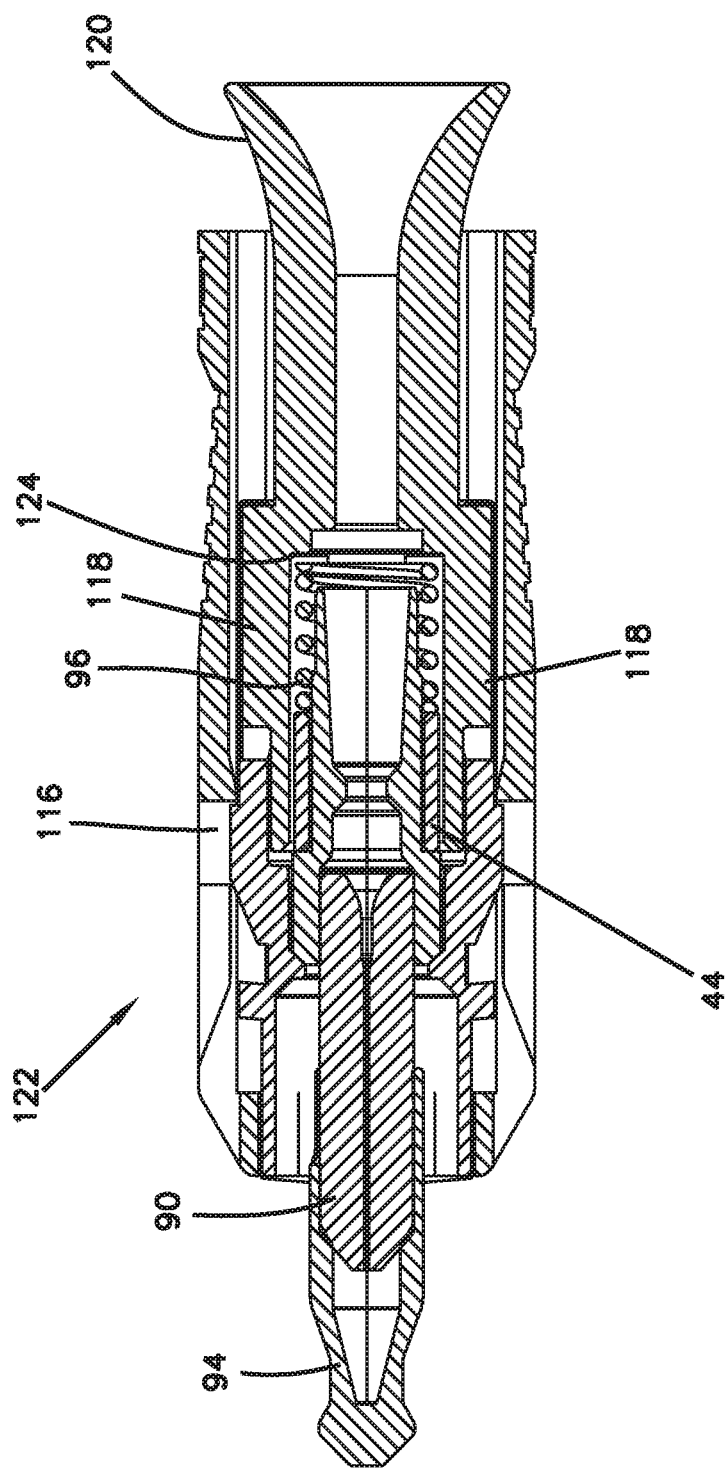
FIG. 11 is an axial cross-sectional view of a fiber optic connector in accordance with the principles of the present disclosure.
Figure 12:
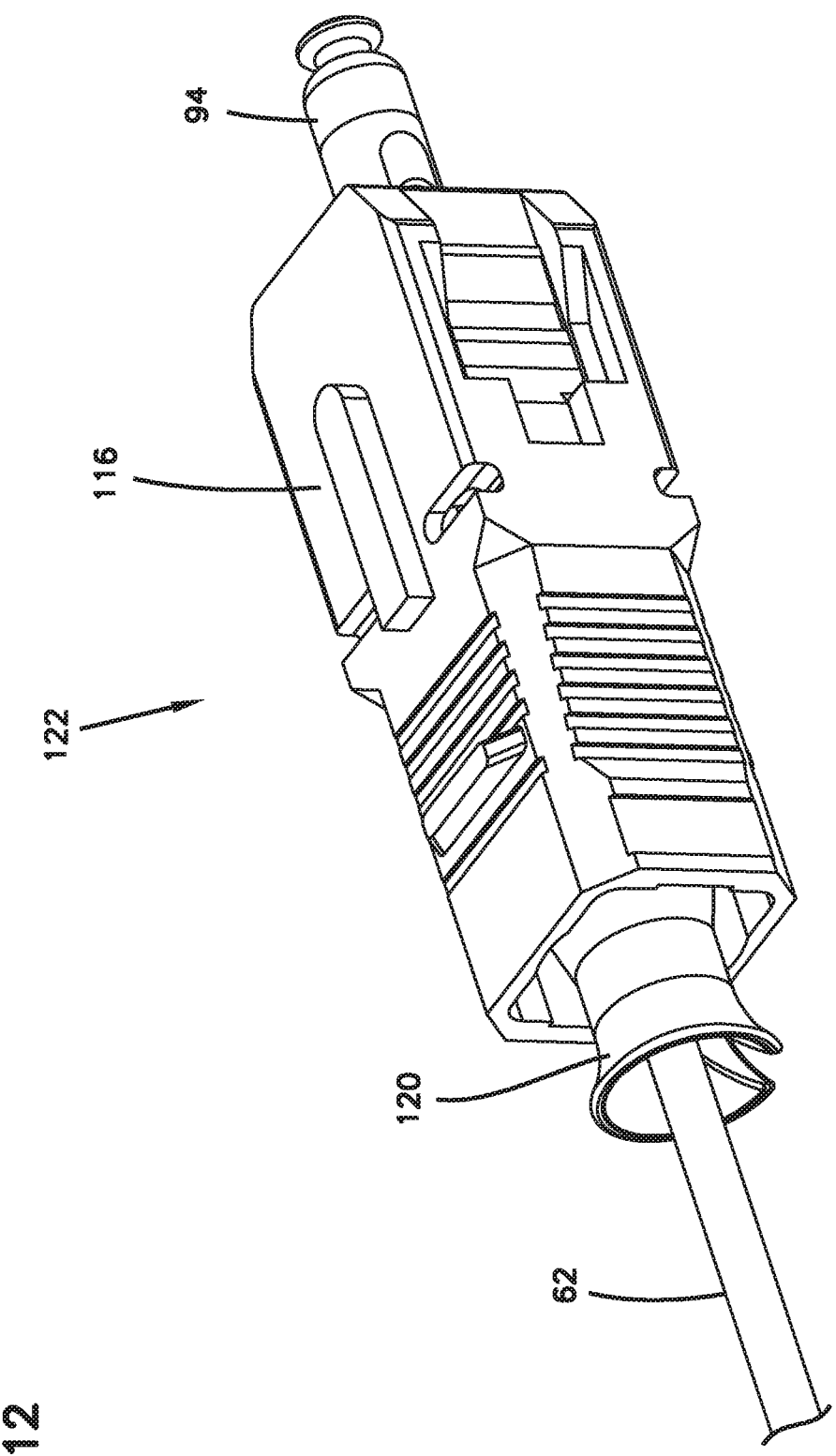
FIG. 12 is a perspective view of the fiber optic connector of FIG. 11.

Once the fiber optic ferrule assembly 64 with its corresponding fiber optic cable 12 has been routed through a microduct, hole, or other path, the field installable subassembly 110 can be easily mounted over the fiber optic ferrule assembly 64 without requiring a skilled artisan. FIGS. 11-12 show the field installable subassembly 110 installed around the fiber optic ferrule assembly 64 to configure an example optical connector 122.

The field installable subassembly 110 includes a proximal connector housing 112 and a distal connector housing 114. In certain examples (e.g., an SC connector), a grip body 116 can be mounted over the distal connector housing 114. In other examples, however, the fiber optic ferrule assembly 64 can be connectorized with an LC connector, an ST connector, an FC connector, an LX.5 connector, or any other desired connector. The assembled connector body is plugged into a port at the connection destination.

The proximal connector housing 112 can be installed over the fiber optic ferrule assembly 64. The fiber optic ferrule assembly 64 is sandwiched between the proximal connector housing 112 and the distal connector housing 114. In some examples, the grip body 116 is mounted to the distal connector housing 114 prior to assembly of the proximal connector housing 112 and the distal connector housing 114. In other examples, the grip body 116 is mounted to the distal connector housing 114 after assembly of the proximal connector housing 112 and the distal connector housing 114.

The proximal connector housing 112 engages the keying member 44 to rotationally retain the keying member 44 (and hence the ferrule hub 92) relative to the proximal connector housing 112. In certain examples, the proximal connector housing 112 also axially limits movement of the ferrule hub 92 and the fiber optic ferrule 90 relative to the proximal connector housing 112.

The proximal connector housing 112 includes latch members 118 configured to hold the proximal connector housing 112 to the distal connector housing 114. In the example shown, the proximal connector housing 112 has two latch members 118 on opposite sides of the circumference of the proximal connector housing 112. When the fiber optic connector 122 is coupled to another fiber optic connector, the fiber optic ferrule 90 can be axially moved rearwardly relative to the fiber optic connector 122 against the bias of the spring 96. For example, the fiber optic ferule 90 can be moved rearwardly until the rear of the ferrule hub 92 contacts a spring stop 124.

The distal connector housing 114 defines an interior keying region configured to receive the ferrule hub 92. In certain examples, the keying region of the distal connector housing 114 defines a plurality of flat surfaces. In one example, the keying region has a hex shape.

In certain examples, the proximal connector housing 112 defines a frustro-conical tail 120 that accommodates lateral pulling and bending of the optical fiber 62 as the optical fiber 62 exits the proximal connector housing 112. In some examples, the rear of the proximal connector housing 112 is configured to mitigate the need for a separate strain-relief boot at the rear of the fiber optic connector 122. For example, the frustro-conical tail 120 may obviate the need for a separate strain-relief boot. Accordingly, the example fiber optic connector 122 does not include a separate strain-relief boot.

That is, the fiber optic ferrule 90 and the hub 92 are mounted within a connector housing shown in dashed lines at FIG. 4. The connector housing 13 can be one of a variety of well known connector types, including SC, FC, ST, LX.5, LC, and others. It will be appreciated that the fiber optic ferrule assembly 64 can be compatible with a number of different categories/types of field installable subassemblies 110 each corresponding to a different style or type of connector. The different types of connectors can include hardened and non-hardened. Thus, once the fiber optic ferrule assembly 64 has been routed through a given microduct, the installer can select from a number of different connector styles so that the factory terminated subassembly can be converted into a fiber optic connector that is compatible with the type of fiber adapter encountered in the field.

Figure 13:
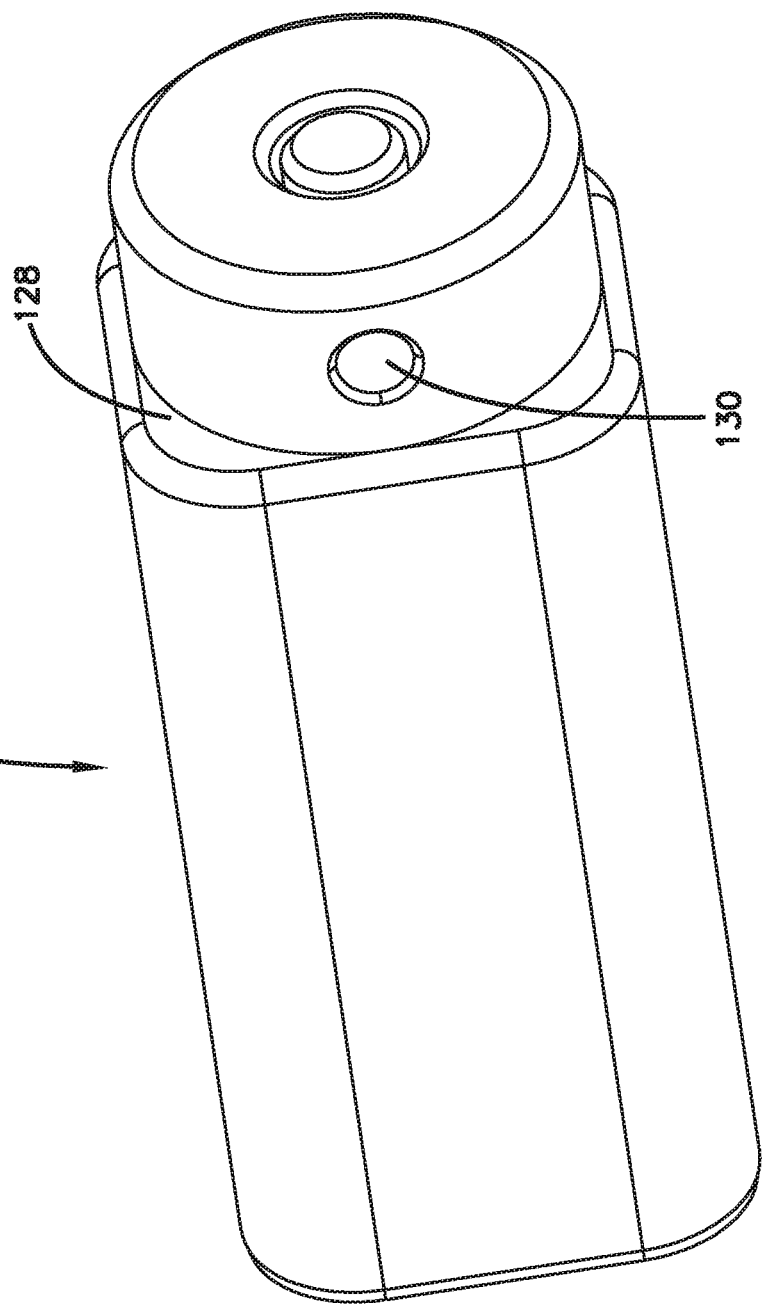
FIG. 13 is a perspective schematic view of an example hole forming tool in accordance with the principles of the present disclosure.

Referring to FIG. 13, an example hole forming tool 126 is depicted. The hole forming tool 126 may be used to create holes in the sides of the protective tube 14, in accordance with the principles of the present disclosure. The hole forming tool 126 includes a stop 128 for the protective tube 14 when the protective tube 14 is positioned thereon. The hole forming tool 126 also includes a guide hole 130 for receiving a drill bit or other mechanism for creating holes in the sides of the protective tube 14. In certain examples, a hole punch type mechanism may be used to create the holes in the protective tube 14. In certain examples, pins used to create the holes have a largest outer diameter of no more than 3.0 mm. In certain examples, pins used to create the holes have an outer diameter of 2.8 mm.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A field installable cable system comprising:
a pushable fiber optic cable including an optical fiber terminated within a fiber optic ferrule, the fiber optic ferrule having a front end and a rear end opposite the front end, a portion of the optical fiber extending rearwardly from the rear end of the fiber optic ferrule;
a protective tube adapted to cover the fiber optic ferrule, the protective tube comprising a circumferential wall having a first open end, a second open end, and an outside diameter, the protective tube having a longitudinal length that extends from the first open end to the second open end, the first and second open ends of the protective tube each defining a first hole that extends through a first sidewall of the protective tube, from an outside surface to an inside surface thereof, and a second hole that extends through a second sidewall of the protective tube, from the outside surface to the inside surface thereof, the first and second holes being aligned relative to one another on opposite sides of the protective tube, the protective tube further defining a bore; and
a first coupling member having a main body with a distal end and a proximal end, the distal end of the first coupling member adapted to mount over an outer jacket of the fiber optic cable, the proximal end of the first coupling member including first and second tabs that are positioned on opposite sides of the main body of the first coupling member;
when the proximal end of the first coupling member is mounted and rotated within the bore of the protective tube at the first open end, the first and second tabs extend a distance through the first and second holes, respectively, for connecting the first coupling member to the protective tube.

2. The field installable cable system according to claim 1, wherein the circumferential wall of the protective tube has a constant thickness between the first and second open ends and around a circumference thereof.

3. The field installable cable system according to claim 2, wherein the tabs have a thickness equal to the constant thickness.

4. The field installable cable system according to claim 2, wherein the distance the first and second tabs extend into the first and second holes, respectively, is less than the constant thickness of the circumferential wall.

5. The field installable cable system according to claim 2, wherein the constant thickness of the circumferential wall is about 0.4 mm.

6. The field installable cable system according to claim 1, wherein the outer diameter of the circumferential wall of the protective tube is slightly smaller than that of a micro-duct through which the protective tube is routed.

7. The field installable cable system according to claim 6, wherein the outer diameter of the circumferential wall is about 5.5 mm and an inside diameter of the micro-duct is about 6.0 mm.

8. The field installable cable system according to claim 1, wherein the distance the first and second tabs extend into the first and second holes, respectively, is such that the first and second tabs do not extend beyond the outside surface of the protective tube.

9. The field installable cable system according to claim 1, wherein the protective tube is constructed as a thin-walled, strong, round tube, of a polymeric material.

10. The field installable cable system according to claim 9, wherein the polymeric material comprises polytetrafluoroethylene.

11. The field installable cable system according to claim 9, wherein the first coupling member has internally threaded surfaces that engage the outer jacket of the fiber optic cable.

12. The field installable cable system according to claim 1, wherein the longitudinal length of the protective tube is from about 400 mm to about 600 mm.

13. The field installable cable system according to claim 1, further comprising a dust cap that is adapted to be pressed fit over the ferrule.

14. The field installable cable system according to claim 1, wherein the first and second tabs extend radially into the first and second holes, respectively, the distance which is approximately one-half of the constant thickness of the circumferential wall.

15. The field installable cable system according to claim 1, wherein the first and second tabs are integrally formed with the main body of the first coupling member.

16. The field installable cable system according to claim 1, further comprising a second coupling member adapted to mount at the second open end of the protective tube.

* * * * *